Sept. 30, 1958  A. D. SCHWOPE  2,854,353
METHOD OF COATING REFRACTORY METALS WITH SILICON AND BORON
Filed Aug. 8, 1955
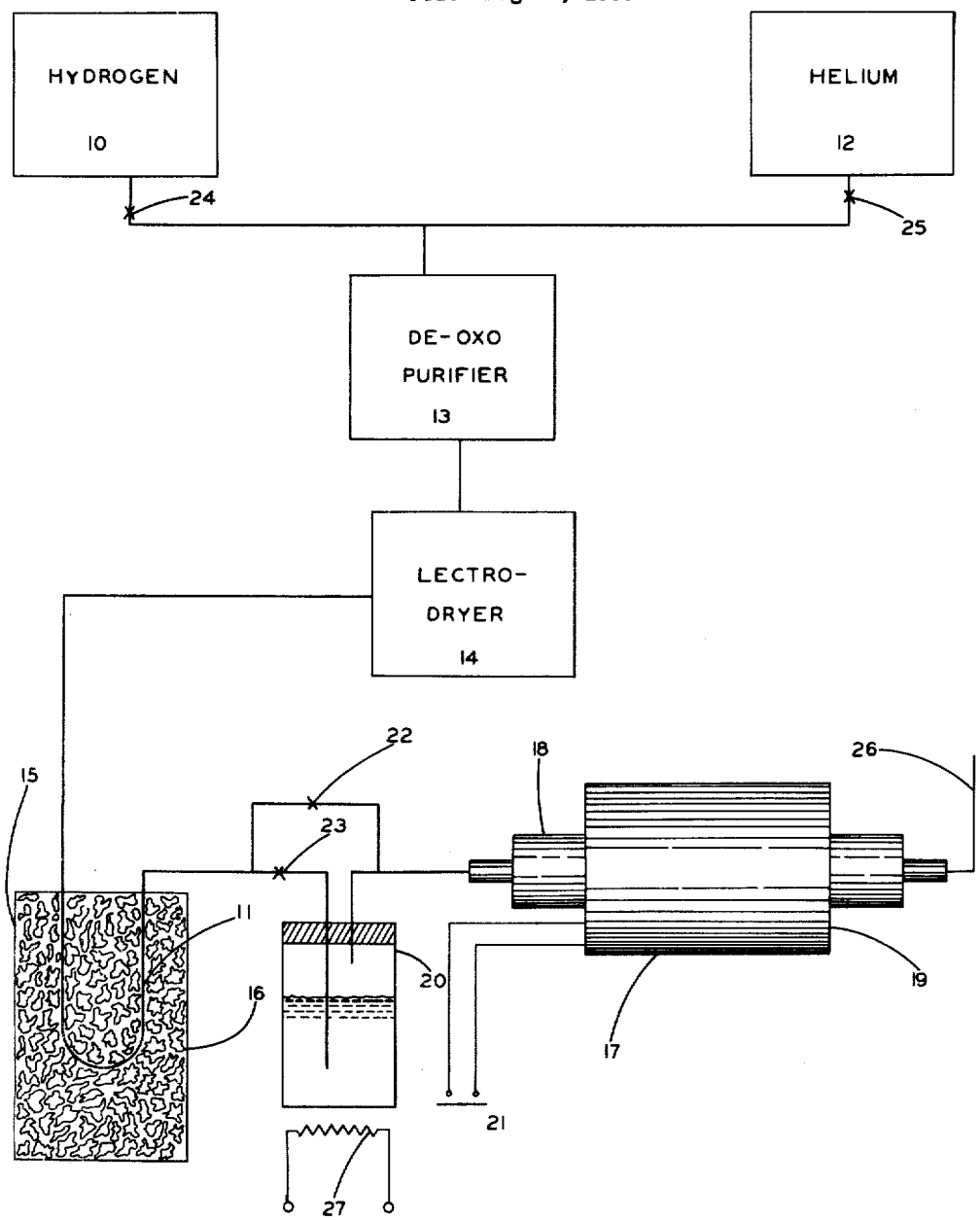
INVENTOR.
ARTHUR D. SCHWOPE
BY *Max L. Wymore*
AGENT

United States Patent Office 2,854,353
Patented Sept. 30, 1958

2,854,353

METHOD OF COATING REFRACTORY METALS WITH SILICON AND BORON

Arthur D. Schwope, South Euclid, Ohio, assignor to Clevite Corporation, Cleveland, Ohio, a corporation of Ohio Application August 8, 1955, Serial No. 526,834

14 Claims. (Cl. 117—47)

This invention relates to a process of coating a refractory metal and more specifically to a process of coating a hydridable refractory metal with another metal, metalloid or non-metal in elemental form by vapor deposition or what is sometimes termed chemical plating.

The advent of atomic power and of jet-propelled vehicles has necessitated development of materials for extreme high temperature service. Conventional products and methods are frequently inadequate, many materials being eliminated from consideration for some applications on the basis of melting point alone. At the same time, the pronounced chemical activity of most materials at elevated temperatures becomes important.

Some of these problems can be eliminated, or at least reduced in importance, by the use of protective coatings. In many cases, even though a refractory body is used, a protective coating may be desirable to improve wear, erosion or corrosion resistance.

A process which has previously been used for producing such a coating is the hydrogen reduction of a volatile metal chloride by passing the chloride in a stream of hydrogen over the heated surface of the metal to be coated. The hydrogen required for the reduction of the halide is supplied from the hydrogen in the gas stream. This process requires high reaction temperatures and considerable difficulty is experienced in the control of thickness of the coating and uniformity. In some instances the reaction temperature required to reduce the halide approaches or exceeds the melting point of the material to be coated.

It is the object of this invention therefore to provide an improved coating process which avoids one or more of the disadvantages of the prior art processes.

It is a further object of this invention to provide an improved coating process which may be carried out at lower temperatures than prior art processes.

It is a further object of this invention to provide an improved coating process wherein predetermined areas may be selectively coated.

A further object of this invention is to provide an improved coating process wherein the requirement of using high temperature resistance reaction chambers is avoided.

A further object of this invention is to provide ease of control of the amount of coating material deposited.

In accordance with this invention the method of producing a protective coating on a hydridable refractory metal article comprises passing a volatile metal halide of the coating element in admixture with an inert carrier gas in contact with the metal article to be coated, at least partially in hydride form maintained at a reaction temperature at least as high as the decomposition temperature of the hydride.

For a better understanding of the present invention, together with other and further objects thereof, reference is had to the following description taken in connection with the accompanying drawing and its scope will be pointed out in the appended claims.

In the drawing:

The figure is a flow diagram of a preferred method of carrying out the invention.

Referring to the figure a hydrogen tank 10 and a helium tank 12 are connected in series through valves 24 and 25 and by means of a conduit to a "De-Oxo purifier 13 made by the Baker Co., Newark, New Jersey. The "De-Oxo" purifier contains a palladium catalyst and a desiccator to remove oxygen and water from the gas stream. The "De-Oxo" purifier is connected by means of a conduit to a "Lectro-dryer" 14 made by the Pittsburgh Lectro-dryer Co., Pittsburgh, Pennsylvania, which contains a desiccator for removal of water vapor. The "Lectro-dryer" is connected by means of a conduit to a molecular sieve 15 which consists of a copper U-tube 11 filled with dehydrated crystals of calcium alumino-silicate and tube 11 is surrounded with Dry Ice 16. The purpose of the molecular sieve is to remove any remaining oxygen or nitrogen from the gas stream.

The molecular sieve is connected through valve 23 to a halide bubble jar 20 and by a conduit to the hydriding and coating furnace 17. The bubble jar may be bypassed through valve 22. The bubble jar 20 may be heated by a heater 27 where necessary to volatilize the halide. The hydriding and coating furnace 17 comprises a reaction chamber 18 made of a suitable material, such as stainless steel, and surrounded with a heater 19 connected to a suitable source of energy 21 to provide the heat necessary for carrying out the reaction. Waste gases are discharged through discharge 26 where they may be recovered or burned or otherwise allowed to escape.

Although the metal hydride may be from any conventional source where high purity is desired, the hydride can be produced in the same apparatus used for the later coating reaction. For example, titanium hydride was produced by placing 200 grams of —28–30 mesh titanium metal powder in reaction chamber 18. Valves 24 and 23 were closed and valve 22 was opened. Valve 25 was opened to purge the system with helium before admitting hydrogen. Valve 25 was then closed and valve 24 opened. Hydrogen was admitted to chamber 18 after passing through the "De-Oxo" purifier 13, the "Lectro-dryer" 14 and molecular sieve 15 where the oxygen, nitrogen and water vapor were removed therefrom. Chamber 18 was then heated to a temperature between 500° C. to 600° C. and held for about one hour at which time hydrogen take up was complete. Where more massive pieces are to be hydrided a greater reaction time may be required depending upon the degree of hydriding desired. It is not essential that a massive piece be completely hydrided, in fact it generally is preferred that the hydriding only be to a depth sufficient to subsequently supply hydrogen in an amount to facilitate the subsequent coating. The thickness of the coating may be conveniently controlled by limiting the amount of hydrogen available for the reaction which may be accomplished by controlling the degree to which the metal is hydrided.

In some instances it may be desired to selectively hydride parts of a piece, such as the teeth of a gear. In this instance a mask with appropriate sealing means is placed over the areas to be protected from hydrogen. Such a mask should not be adversely affected by hydrogen at the temperatures involved or contaminate the article to be coated and should be sufficiently soft to form a satisfactory seal. Steel and copper are suitable materials.

In carrying out the coating process a refractory metal at least partially in hydride form from any source is placed in reaction chamber 18 where the hydride is brought up to a reaction temperature of from 500° C. to 800° C. in a hydrogen atmosphere. The hydrogen atmosphere serves to prevent premature decomposition of the hydride. When the reaction temperature is reached, valves 24 and 22 are closed and valves 25 and 23 are opened. Helium, after treatment to remove oxygen, nitrogen and water, is then passed through bubble jar 20 containing a volatile halide of the material to be deposited on the refractory metal such as, for example, silicon tetrachloride and boron trichloride. The halide is introduced into the reaction chamber 18 maintained at a pressure of from 1 to 2 atmospheres with the helium acting as a carrier. The hydride at reaction temperature in an atmosphere of helium decomposes evolving atomic hydrogen at the surface thereof which reduces the halide vapors passing over the surface of the hydride and the cation of the halide in elemental form deposits as a coating thereon. This reaction proceeds until substantially all of the hydrogen has been evolved from the hydride with concurrent deposition of a coating on the surface of the resulting refractory metal. The reaction products pass out of the reaction chamber at 26 and are disposed of. The coating efficiency is enhanced due to the reduction reaction occurring substantially at the surface of the article to be coated.

In a specific example titanium hydride as previously prepared in the reaction chamber 18 is maintained at a preferred reaction temperature of from 500° C. to 600° C. under hydrogen. Purified helium is admitted to bubble jar 20 containing silicon tetrachloride from tank 12. The helium containing silicon tetrachloride vapors is then introduced into the reaction chamber 18 where the silicon tetrachloride is reduced by hydrogen evolving from the surface of the titanium hydride. As the halide is reduced, silicon is deposited as a thin layer on the surface of the hydride until substantially complete evolution of hydrogen had occurred. The reaction was found to be substantially complete for the 200 gram titanium hydride sample in about 5 minutes. The siliconized titanium is cooled in a helium atmosphere, removed from the reaction chamber and leached with methanol to remove any titanium chlorides which may have formed. Prolonged heating after the hydride is decomposed will result in the removal of silicon from the surface of the titanium due to reaction of elemental silicon with silicon tetrachloride to form lower chlorides. It was found for this sample that maintaining the refractory metal at reaction temperature in contact with the halide for periods greater than 15 minutes resulted in the loss of some silicon from the coating.

Since titanium and zirconium are subject to hydrogen embrittlement, to restore substantially complete ductility to the refractory body, the siliconized product may be subjected to a vacuum anneal at from 1000° F. to 2000° F. while maintained under a vacuum of less than one micron for a time sufficient to substantially completely remove any residual hydrogen. This may be accomplished normally in from one to two hours, depending upon the mass and surface area of the article.

The product comprises a silicon coated titanium article characterized by the presence of intermetallic compounds of silicon and titanium having a proportionately smaller silicon content from the exterior of the silicon layer to the titanium body. The coating of silicon serves to protect the titanium from oxidation at elevated temperatures and serves to preserve high temperature strength after long periods of exposure to high temperatures. The coating method of this invention may be applied with equal success to alloys of hydridable refractory metals in hydride form capable of being decomposed with heat to liberate hydrogen.

Where the deposition of silicon on titanium is attempted to be carried out by passing silicon tetrachloride in a stream of hydrogen over a titanium article, the titanium article is required to be maintained at temperatures on the order of 1000° C. to 1800° C. Since the accepted melting point of titanium is about 1650° C. the reaction may occur above the melting point of titanium or the silicon-titanium eutectic which has a melting point of about 1330° C. This is not readily determinable since the reaction is extremely violent, making it difficult to control and contain. The reaction equipment for such reaction is required to withstand the high temperatures involved without adversely affecting the reactants. Such materials of construction are not presently known. A similar reaction temperature of from 1100° C. to 1500° C. is required for the coating of silicon on zirconium metal where silicon tetrachloride is carried in a hydrogen stream.

Conversely the reaction of this invention proceeds at reasonable rates, at temperatures which do not require expensive reactors or complicated techniques and control may be readily maintained. The amount of material deposited may be controlled by the degree of hydriding of the refractory metal thus regulating the amount of hydrogen available to reduce the halide.

While not intending to be limited thereto it is believed that the process of the present invention proceeds at much lower temperatures than previous halide reduction coating processes due to the evolution of atomic hydrogen on decomposition of the hydride. Hydrogen in the atomic state being more reactive than molecular hydrogen allows the reduction of the halide to proceed at the lower temperature. Since the reaction occurs at the surface to be coated the coating efficiency is high as substantially all of the reduced halide deposits on the article rather than on all surfaces present in the reactor as in prior art methods.

While titanium and zirconium lend themselves well to the process of this invention other refractory metals capable of reacting with hydrogen to form the hydride are suitable. Likewise whereas only silicon and boron halides are specifically disclosed other volatile halides may be substituted therefore with equal success in the form of the chloride as well as the bromide and iodide. Modifications in reaction temperatures and time will be required as recognized by those skilled in the art depending upon the reactants, mass of the hydride and its surface area. The thickness of coating and area of deposition may be regulated by the degree of hydriding and the area hydrided.

While there have been described what at present are considered to be the preferred embodiments of this invention, it will be obvious to those skilled in the art that various changes and modifications may be made therein without departing from the invention, therefore it is aimed in the appended claims to cover all such changes and modifications which fall within the true spirit and scope of the invention.

I claim:

1. A method of coating a metal, selected from the group consisting of hydridable refractory metals and hydridable alloys thereof with an element which forms a volatile halide, comprising passing a volatilized halide of said element in a stream of inert gas in contact with said metal, at least partially in hydride form and maintained at a temperature at least as high as the decomposition temperature of said hydride to thereby liberate hydrogen therefrom and reduce said halide, in situ, and maintaining said metal in contact with said stream for at least 5 minutes and until a coating of said element is formed on the surface thereof resulting from the reduction of the halide.

2. A method of producing a corrosion and temperature resistant article of a metal selected from the group consisting of hydridable refractory metals and hydridable alloys thereof which comprises passing a volatilized halide selected from the group consisting of silicon and boron halides in a stream of inert gas in contact with an article of said metal, at least partially in hydride form and maintained at a temperature at least as high as the decomposition temperature of the hydride of said metal, to thereby liberate hydrogen therefrom and reduce said halide in situ, and maintaining said article in contact with said stream for at least 5 minutes and until a coating of said element is formed on the surface thereof resulting from the reduction of said halide.

3. A method of producing a corrosion and temperature resistant metal article which comprises passing a volatilized halide, selected from the group consisting of silicon and boron halides, in a stream of inert gas in contact with an article of a metal at least partially in hydride form, selected from the group consisting of titanium and zirconium and maintained at a temperature at least as high as the decomposition temperature of said hydride to thereby liberate hydrogen therefrom and reduce said halide in situ, and maintaining said article in contact with said stream for at least 5 minutes and until a coating is formed on the surface thereof resulting from the reduction of the halide.

4. A method of producing a corrosion and temperature resistant article of titanium which comprises passing a volatilized halide selected from the group consisting of silicon and boron halides in a stream of inert gas in contact with a titanium article at least partially in hydride form maintained at a temperature at least as high as the decomposition temperature of titanium hydride to thereby evolve hydrogen therefrom and reduce said halide in situ, and maintaining said article in contact with said stream for at least 5 minutes and until a coating is formed on the surface thereof resulting from the reduction of said halide.

5. A method of producing a corrosion and temperature resistant article of zirconium which comprises passing a volatilized halide selected from the group consisting of silicon and boron halides in a stream of inert gas in contact with a zirconium article at least partially in hydride form maintained at a temperature at least as high as the decomposition temperature of zirconium hydride to thereby evolve hydrogen therefrom and reduce said halide in situ, and maintaining said article in contact with said stream for at least 5 minutes and until a coating is formed on the surface thereof resulting from the reduction of said halide.

6. A method of producing a corrosion and temperature resistant article of titanium which comprises passing volatilized silicon tetrachloride in a stream of inert gas in contact with a titanium article at least partially in hydride form maintained at a temperature at least as high as the decomposition temperature of titanium hydride to thereby evolve hydrogen therefrom and reduce said silicon tetrachloride in situ, and maintaining said article in contact with said stream for at least 5 minutes and until a silicon coating is formed on the surface thereof resulting from the reduction of halide.

7. A method of producing a corrosion and temperature resistant article of titanium which comprises passing volatilized boron trichloride in a stream of inert gas in contact with a titanium article at least partially in hydride form maintained at a temperature at least as high as the decomposition temperature of titanium hydride to thereby evolve hydrogen therefrom and reduce said boron trichloride in situ, and maintaining said article in contact with said stream for at least 5 minutes and until a boron coating is formed on the surface thereof resulting from the reduction of said boron trichloride halide.

8. A method of producing a corrosion and temperature resistant article of zirconium which comprises passing volatilized boron trichloride in a stream of inert gas in contact with a zirconium article at least partially in hydride form maintained at a temperature at least as high as the decomposition temperature of zirconium hydride to thereby evolve hydrogen therefrom and reduce said boron trichloride in situ, and maintaining said article in contact with said stream for at least 5 minutes and until a boron coating is formed on the surface thereof resulting from the reduction of said boron trichloride.

9. A method of producing a corrosion and temperature resistant article of zirconium which comprises passing volatilized silicon tetrachloride in a stream of inert gas in contact with a zirconium article at least partially in hydride form maintained at a temperature at least as high as the decomposition temperature of zirconium hydride to thereby evolve hydrogen therefrom and reduce said silicon tetrachloride in situ, and maintaining said article in contact with said stream for at least 5 minutes and until a silicon coating is formed of the surface thereof resulting from the reduction of said silicon tetrachloride.

10. A method of coating an article at least part of the surface of which is of a hydride of a hydridable refractory metal, with an element which forms a volatile halide, comprising: passing a volatilized halide of said element in a stream of inert gas in contact with said article while maintaining said article at a temperature at least as high as the decomposition temperature of said hydride to thereby liberate hydrogen therefrom and reduce said halide in situ, and maintaining said article in contact with said stream until a coating of said element is formed on the surface thereof by the reduction of said halide.

11. A method of coating a metal, selected from the group consisting of hydridable refractory metals and alloys, with an element which forms a volatile halide, comprising: passing a volatilized halide of said element in a stream of inert gas in contact with said metal, at least part of which metal is in hydride form, while maintaining said metal at a temperature at least as high as the decomposition temperature of said hydride, whereby hydrogen is liberated from said hydride and reduces said halide in situ, and maintaining said metal in contact with said stream until a coating of said element is formed on the surface thereof by the reduction of said halide.

12. A method according to claim 11 comprising the further step of cooling said metal in an inert atmosphere.

13. A method of coating a metal, selected from the group consisting of hydridable refractory metals and alloys, with an element which forms volatile halides, comprising: hydriding at least part of the surface of such metal to a depth preselected in direct proportion to the thickness of the coating to be applied; passing a volatilized halide of said element in a stream of inert gas in contact with the surface of said metal while maintaining said metal at a temperature at least as high as the decomposition temperature of the hydrided metal, whereby hydrogen is liberated from the hydrided metal surface and reduces said halide in situ; and maintaining said metal surface in contact with said stream until substantially all of the hydrogen is liberated and a coating of said element is formed on said surface by the reduction of said halide.

14. A method according to claim 13 including the subsequent further steps of discontinuing passing said halide in contact with said surface and cooling said metal in an inert atmosphere.

References Cited in the file of this patent

UNITED STATES PATENTS

| | | |
|---|---|---|
| 2,427,338 | Alexander | Sept. 16, 1947 |
| 2,501,051 | Henderson et al. | Mar. 21, 1950 |
| 2,528,454 | Schlesinger et al. | Oct. 31, 1950 |
| 2,612,442 | Goetzel | Sept. 30, 1952 |
| 2,665,475 | Campbell | Jan. 12, 1954 |
| 2,689,807 | Kempe et al. | Sept. 21, 1954 |

FOREIGN PATENTS

| | | |
|---|---|---|
| 633,701 | Great Britain | Dec. 19, 1949 |

UNITED STATES PATENT OFFICE
CERTIFICATE OF CORRECTION

Patent No. 2,854,353 — September 30, 1958

Arthur D. Schwope

It is hereby certified that error appears in the printed specification of the above numbered patent requiring correction and that the said Letters Patent should read as corrected below.

Column 1, line 62, strike out "metal", second occurrence; column 2, line 6, for "conduit to a "De-Oxo purifier 13" read -- conduit to a "De-Oxo" purifier 13 --; line 34, after "source" insert a comma; same line, after "desired" strike out the comma; column 5, line 11, after "metal" insert a comma; line 54, after "reduction of" strike out "halide" and insert instead -- said silicon tetrachloride --; column 5, line 66, strike out "halide".

Signed and sealed this 8th day of September 1959.

(SEAL)
Attest:

KARL H. AXLINE
Attesting Officer

ROBERT C. WATSON
Commissioner of Patent